(12) United States Patent
Powell et al.

(10) Patent No.: US 6,612,381 B2
(45) Date of Patent: Sep. 2, 2003

(54) SEEDBED PREPARATION IMPLEMENT HAVING ROTARY DISC WITH ADJUSTABLE GANG ANGLE

(75) Inventors: Jeffrey Powell, Round Lake, IL (US); Edward G. Sheets, Eureka, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/992,142

(22) Filed: Nov. 6, 2001

(65) Prior Publication Data

US 2003/0085045 A1 May 8, 2003

(51) Int. Cl.$^7$ ................................................. A01B 5/00
(52) U.S. Cl. ........................ 172/586; 172/581; 172/600; 172/178; 172/145
(58) Field of Search ................................. 172/584, 586, 172/579, 580, 581, 599, 600, 603, 145, 142, 175, 178

(56) References Cited

U.S. PATENT DOCUMENTS

| | | | |
|---|---|---|---|
| 2,226,586 A | * 12/1940 | Seaholm | 172/240 |
| 2,588,872 A | * 3/1952 | Price, Jr. | 172/600 |
| 2,601,640 A | * 6/1952 | Simmons | 172/440 |
| 2,667,724 A | 2/1954 | Johnson et al. | |
| 3,080,933 A | 3/1963 | Kramer et al. | |
| 3,131,775 A | 5/1964 | Long | |
| 3,193,023 A | 7/1965 | Adee | |
| 3,637,028 A | * 1/1972 | Fueslein et al. | 172/582 |
| 3,643,743 A | * 2/1972 | Fueslein | 172/600 |
| 3,648,781 A | * 3/1972 | Mayer | 172/568 |
| 3,826,315 A | 7/1974 | Blair | |
| 4,180,135 A | 12/1979 | Birkenbach et al. | |
| 4,361,191 A | 11/1982 | Landoll et al. | |
| 4,454,920 A | 6/1984 | Dietrich, Sr. | |
| 4,479,549 A | 10/1984 | Fegley | |
| 4,564,073 A | * 1/1986 | Ide et al. | 172/120 |
| 5,078,216 A | * 1/1992 | Dick | 172/117 |
| 5,082,064 A | * 1/1992 | Landoll et al. | 172/178 |
| 5,097,908 A | * 3/1992 | Kirch | 172/78 |
| 5,462,123 A | 10/1995 | Harlan et al. | |

FOREIGN PATENT DOCUMENTS

AU 268830 * 6/1964 .................. 172/600

* cited by examiner

Primary Examiner—Victor Batson
(74) Attorney, Agent, or Firm—Rebecca Henkel (57) ABSTRACT

A disc gang is provided that is suitable for use as part of a multifunctional seedbed preparation implement or in a standalone disc harrow. The disc gang is configured to permit a gang angle of the disc gang to be adjusted to accommodate differing soil conditions and/or to obtain different tillage characteristics. The disc gang may include a frame mounted on a mainframe of a primary tillage implement such as a cultivator. The frame includes a main beam mounted on the implement's mainframe and a disc support beam connected to the main beam and supporting a plurality of rotating discs. The gang angle can be infinitely adjusted through a designated range by pivoting one end of the disc gang about a vertical pivot axis while permitting another end portion of the disc gang to slide along a support surface for that end. The disc support beam may also be configured to be raised and lowered relative to the main beam so as to permit the cutting depth of the discs to be adjusted independently of the working depth of the remainder of the implement. The disc gang preferably is modular so as to negate the need for complex mechanical and hydraulic connections between the disc gang and the remainder of the implement.

17 Claims, 8 Drawing Sheets

SEEDBED PREPARATION IMPLEMENT HAVING ROTARY DISC WITH ADJUSTABLE GANG ANGLE

BACKGROUND OF THE INVENTION

1. Field of the Invention

The invention relates to seedbed preparation implements and, more particularly, relates to a disc gang usable, e.g., on a multifunctional seedbed preparation implement and having an adjustable gang angle.

2. Discussion of the Related Art

An increasing number of seedbed preparation implements are configured to till the soil, level it, and/or break up lumps in a single pass so as to minimize the number of passes required to prepare a field for planting. Implements of this general type are sometimes known as "multifunctional seedbed preparation implements." Multifunctional seedbed implementation implements are gaining popularity because minimizing the number of required passes conserves fuel and also reduces wind and water erosion.

One type of multifunctional seedbed preparation implement is the so-called Combo Mulch Finisher, manufactured, e.g. by Case Corporation. The Combo Mulch Finisher includes a disc harrow having one or more disc gangs, a cultivator located behind the disc harrow, and an optional rotary or tine harrow located behind the cultivator. The three tandem-oriented implement components are configured to partially or completely prepare a seedbed for planting, yet leave a high residue cover for maximum conservation efforts. Specifically, the front disc harrow aggressively cuts and sizes residue ahead of the cultivator and turns the soil to bury some of the residue. The cultivator shatters clods produced by the disc harrow, mixes the clods with the soil, incorporates chemicals, and returns some of the residue to the surface. The rear harrow, if present, reduces clods and levels ridges left by the cultivator. The working depth of the entire implement can be adjusted by raising or lowering the cultivator mainframe relative to the wheels that support it on the ground. In some implements of this type, the working depth of the individual disc gangs of the disc harrow can be independently adjusted by raising and lowering at least a disc-suspension portion of each disc gang relative to the cultivator.

Each disc gang typically includes a plurality of concave circular steel discs with tapered or beveled peripheral edges. The discs, although tending to roll or rotate as they are pulled forward, penetrate into and break up the soil and stalks and other residue lying on the ground. The soil and residue then ride along and across the concave surfaces so as to be turned or inverted. A portion of the residue is buried with this turning, with the percentage of buried residue increasing with the amount of soil turning. The amount of soil turning is determined, in part, by the angle of attack of each disc blade relative to the draft direction, i.e., the direction along which the implement is being pulled along the field. This angle of attack is known as the "gang angle" and is defined as the angle of the discs' gang axis relative to a line extending perpendicularly to the draft direction. Typical gang angles range from 5° to 10°, but other angles are used in some situations.

It is often desirable to adjust the gang angle in order to set or maintain a desired amount of soil turning for, e.g., residue management or tilth management purposes. Residue management comprises controlling a seedbed preparation implement to leave a desired percentage of the seedbed surface covered by crop residue. This percentage typically ranges from about 30% to about 70%, depending on field conditions and other factors. Proper residue management provides several benefits, including:

protecting the soil surface from compaction, crusting, and erosion by absorbing the energy of rainfall on the soil;

building soil organic matter to increase moisture holding capacity and expand soil nutrient pool;

building and strengthening soil aggregates to resist crusting and provide adequate pore space and water permeability;

improving water infiltration;

accelerating soil warming to take full advantage of the growing season; and creating a soil environment needed for higher yields.

Soil tilth is a measure of the relationship between the soil, air, water, organic matter, and biological activity. Good soil tilth has approximately 50% mineral soil and organic matter and about 50% pore space. Maintaining good soil tilth provides several advantages, including:

maximizing water and air permeability to reduce ponding, run-off, and erosion;

allowing good early root growth;

increasing air and water exchange from plant food availability;

enabling percolation of excess water deep into the soil; and enabling roots to penetrate deeper into the soil to provide moisture needed during periods of drought.

Setting the gang angle at a desired value is one viable method of obtaining desired residue retention and/or tilth characteristics under prevailing soil conditions and operating speeds. It would be beneficial to adjust that angle to obtain different residue retention and/or tilth characteristics under the same operating conditions or to maintain the same residue retention and/or tilth characteristics as soil conditions and/or operating speeds vary from area to area or even from field to field. Hence, incorporating gang angle adjustability into a disc gang of a multifunctional seedbed preparation implement would considerably increase the flexibility and versatility of a disc gang. However, no heretofore known multifunctional seedbed preparation implement employed disc gangs with adjustable gang angles. This lack is believed to result from impracticalities resulting from the ways in which these machines were constructed and operated.

The gang angles of some standalone disc harrows are adjustable, but adjustment is typically either difficult or imprecise. For instance, U.S. Pat. No. 3,080,933 to Kramer, U.S. Pat. No. 4,180,135 to Birkenbach, and U.S. Pat. No. 5,462,123 to Harlan all disclose tandem disc harrows having front and rear sets of disc gangs, each of which includes two disc gangs that have independently adjustable gang angles. Each disc gang of all of these systems includes a rigid frame that is mounted on the mainframe of the disc harrow so as to pivot about a vertical axis. Another portion of the frame is mountable on the mainframe only at a selected one of a plurality of discreet, spaced-apart mount points, usually taking the form of spaced mounting holes in a plate on the disc harrow's mainframe. As a result of this configuration, the gang angle cannot be adjusted "infinitely", i.e., continuously within the range of gang angle adjustment. It instead can be adjusted only discreetly, with a degree of precision that is limited by the spacing between the mount points. The resultant configuration has relatively low flexibility and versatility. It is also poorly suited for adaptability to disc gangs used in a Combo Mulch Finisher or any other multifunctional seedbed preparation implement.

The need therefore has arisen to provide a multifunctional seedbed preparation implement having disc gangs with adjustable gang angles.

The need has also arisen to provide a disc gang that is usable either on a multifunctional seedbed preparation implement or on a standalone disc harrow and that has infinite gang angle adjust capability, at least over a designated range of gang angle adjustment.

SUMMARY OF THE INVENTION

In accordance with a first aspect of the invention, a multifunctional seedbed implement includes a disc gang having a gang angle that is adjustable relative to the remainder of the implement. The implement includes at least a cultivator and a disc harrow. The cultivator includes a mainframe configured to be pulled in a draft direction, and a plurality of ground engaging plow shanks mounted on the mainframe. The disc harrow include at least one disc gang including a disc support beam, a plurality of ground engaging discs rotatably supported on the support beam and configured to rotate about a common axis that extends at a disc gang angle relative to a perpendicular to the draft direction, and a main beam which is attached to the disc support beam and which is mounted on the mainframe so as to permit the disc gang to be movable relative to the frame as a unit so as to adjust the gang angle.

Preferably, the gang angle is infinitely adjustable within at least a designated range of, e.g., from about 5° to about 10°.

The main beam is preferably pivotably mounted on the mainframe adjacent a first end thereof and is mounted on a slotted plate at a location remote from the first end so as to permit the main beam to slide along a slot in the slotted plate for gang angle adjustment. An actuator, such as a cylinder or a turnbuckle, is coupled to the disc gang and to the mainframe and is manually or automatically actuatable to pivot the disc gang about to the mainframe to effect gang angle adjustment.

In order to permit the cutting depth of the discs to be adjusted, support arms may couple the main beam to the disc support beam and may be pivotable to raise and lower the disc support beam relative to the main beam.

In accordance with another aspect of the invention, a disc gang is provided that is configured for attachment to a mainframe of a seedbed preparation implement that is configured to be pulled in a draft direction. The implement may be a standalone disc harrow or a multifunctional implement such as a Combo Mulch Finisher. The disc gang comprises a plurality of ground engaging rotary discs and a frame. The discs are configured to rotate about an axis that extends at a gang angle relative to a perpendicular to the draft direction. The frame supports the discs and is configured to be connectable to the frame so as to be movable relative to the implement's mainframe so as to permit the gang angle to be infinitely adjusted through a range of at least 3°. The frame preferably comprises a main beam which is mountable on the implement's mainframe and a disc support beam. The disc support beam is located in front of the main beam, is connected to the main beam by a plurality of arms, and supports the discs. Preferably, the arms are pivotable to raise and lower the disc support beam relative to the main beam and, thereby, adjust the cutting depth of the discs.

A method of adjusting the gang angle of a disc gang is also disclosed.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

Pursuant to the invention, a disc gang is provided that is well suited (but not exclusively suited) for use as part of a multifunctional seedbed preparation implement and that is configured to permit a gang angle of the disc gang to be adjusted to accommodate different operating conditions and/or to obtain different tillage characteristics. In one embodiment, the disc gang includes a frame mounted on a mainframe of a primary tillage implement such as a cultivator. The frame includes a main beam mounted on the implement's mainframe and a disc support beam connected to the main beam and supporting a plurality of rotating discs. The gang angle can be infinitely adjusted through a designated range of, e.g., about 5° to about 10°, by pivoting one end of the disc gang about a vertical pivot axis while permitting another end portion of the disc gang to slide along a slotted plate or other unsegmented support surface for that end portion. The disc support beam may also be configured to be raised and lowered relative to the main beam so as to permit the cutting depth of the discs to be adjusted independently of the working depth of the remainder of the implement. The disc gang preferably is modular so as to negate the need for complex mechanical and hydraulic connections between the disc gang and the remainder of the implement.

2. System Overview

Disc gangs constructed in accordance with the invention can be used on a variety of implements. They may be used on a standalone implement such as a tandem disc harrow having front and rear disc gang sets. They are particularly well suited for use in a multifunctional seedbed preparation implement such as a Combo Mulch Finisher and, accordingly, will be described in conjunction with such a seedbed preparation implement, it being understood that they are not limited to that type of implement.

Figure 1:
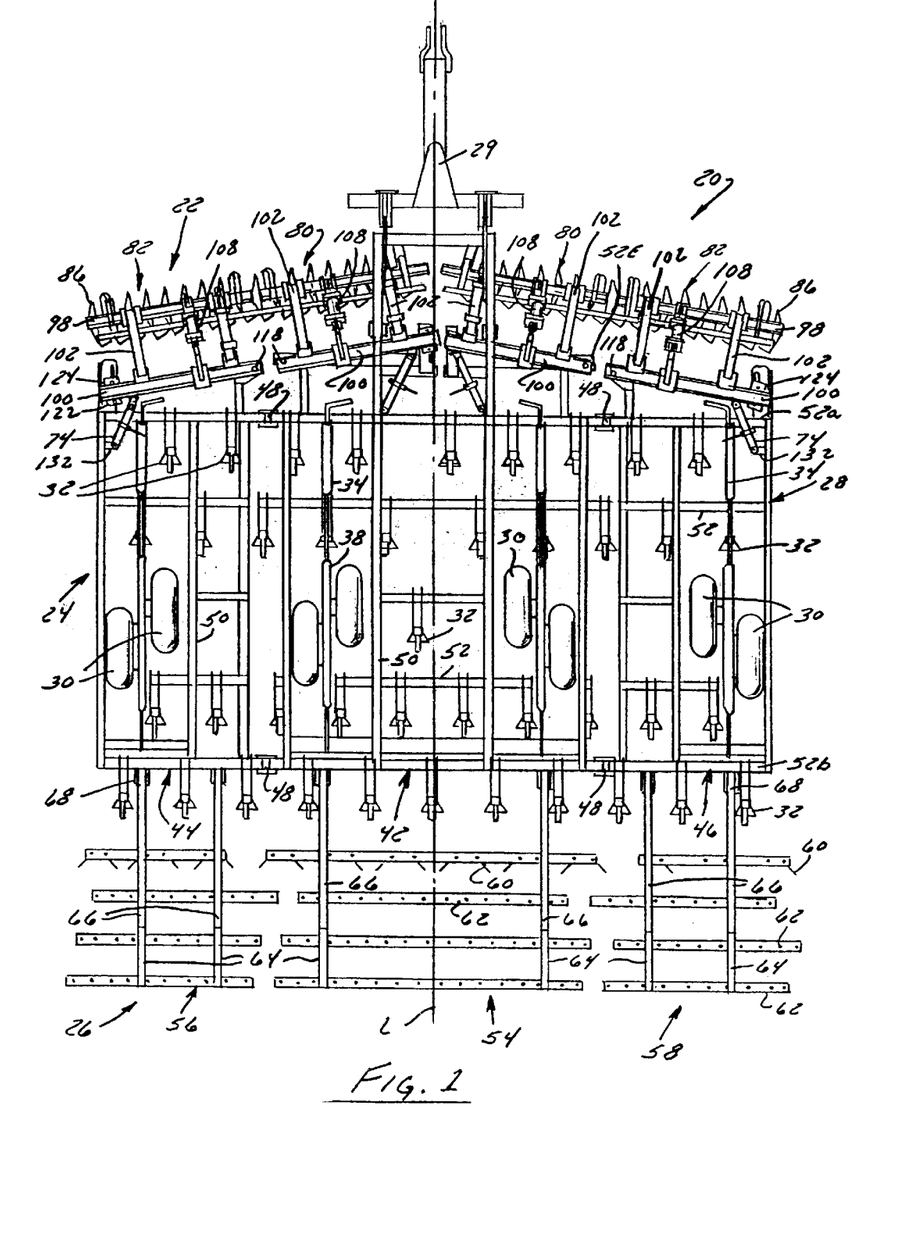
FIG. 1 is a top plan view of a multifunctional seedbed preparation implement constructed in accordance with a preferred embodiment of the invention.
Figure 2:
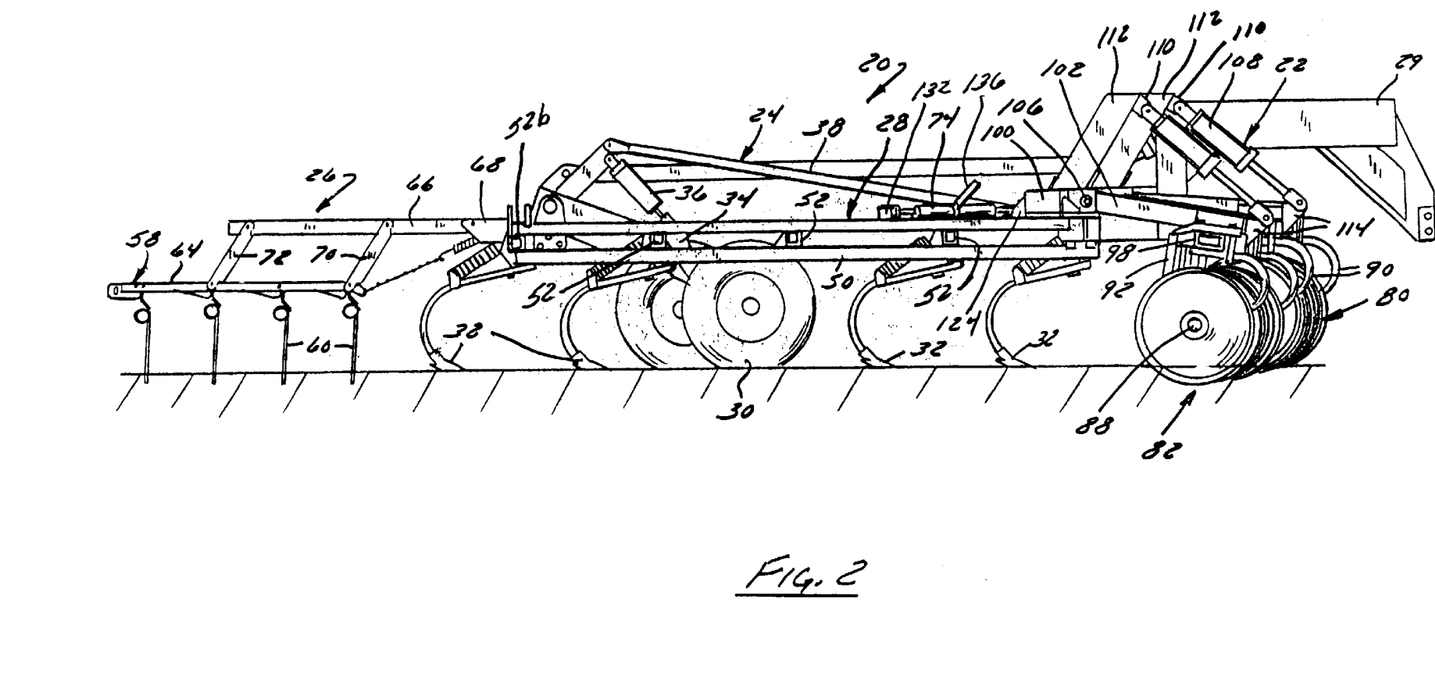
FIG. 2 is a side elevation view of the implement of FIG. 1.

Referring now to FIGS. 1 and 2 a Combo Mulch Finisher implement 20 incorporating disc gangs having the characteristics described above includes a front disc harrow 22, a cultivator 24 located behind the disc harrow and supporting the disc harrow, and a rear harrow 26 (in this case a tine harrow) towed behind the cultivator 24. The implement 20 is towed by a hitch 29 that extends forwardly from a mainframe 28 of the cultivator 24 and that is configured for connection to the drawbar of a tractor or the like. The hitch 29 is a single strap pull clevis style hitch with a safety chain and hitch jack (not shown). The hitch 29 is long enough to allow tight turning without interfering with the rear dual or triple tractor tires.

The construction and operation of the cultivator 24 and rear harrow will now be briefly described. The construction and operation of the disc harrow 22 will be detailed in Section 3 below.

Still referring to FIGS. 1 and 2, the cultivator 24 is configured to plow soil for seedbed preparation. It includes the mainframe 28, wheels 30 that support the mainframe 28 on the ground, and a plurality of plow shanks or sweeps 32 that extend downwardly from the mainframe 28 for working the soil. The wheels 30 are mounted on arms 34 that are pivotable with respect to the mainframe 28. The arms 34 are coupled to a hydraulic cylinder 36 by a suitable linkage 38 that raises and lowers the arms 34 upon cylinder extension and retraction. The wheels 30 therefore can be raised from their illustrated, lowermost position to either 1) a partially raised position to reduce the penetration depth of the shanks 32 or 2) a fully raised position for transport. The typical working depth will vary from machine to machine and most often will be between 7 and 8 inches. A depth indicator (not shown) may be provided for a quick reference on the operating depth of the cultivator.

The cultivator mainframe 28 is divided into three transversely adjacent sections including a center section 42 and a pair of wings 44, 46 that are articulated to the center section 42 by hinges 48. The wings 44, 46 can flex upwardly about 10° and downwardly about 9° to follow uneven terrain and contours in the field, thereby promoting consistent seedbed depth for ideal planting conditions. Each section 42, 44, 46 is formed from a plurality of longitudinally extending beams 50 and a plurality of transversely extending beams 52 interconnected to one another.

In the illustrated embodiment, the forwardmost beam 52a doubles as a support for at least part of the disc harrow 22, and the rearwardmost beam 52b doubles as an articulation point for the rear harrow 26. Some of the beams 52 also support the shanks 32. Those transverse beams 52 that support shanks 32 are spaced longitudinally from one another to form rows or "ranks." Each of the beams 52 preferably comprises a hollow rectangular tube, and those beams that support the plow shanks therefore are often referred to as "rank tubes."

The cultivator 24 of the illustrated embodiment has five ranks. The shanks 32 of successive ranks are indexed relative to the lines of travel of the shanks of the remaining ranks to effect a so-called "split the middle" sweep pattern, which allows for complete tilling and the production of uniform ridges as described below. Of course, the number of sections, the number of ranks, and the number of plow shanks in each rank will vary from application to application depending, e.g., on the intended width of the tilled swath, the type of soil, and the degree of seedbed preparation desired.

The characteristics of the particular plow shanks 32 employed for a given operation will vary depending upon the intended function of the implement and its intended operating conditions. For moderate soil conditions where a high action spring tension shank is desired, a so-called "vibra shank" will likely be employed. In applications in which reduced soil disturbance and reduced fuel consumption are desired, a so-called "vibra edge shank" will likely be employed. A so-called "vibra chisel shank" will likely be employed under heavy soil conditions.

The rear harrow 26 will now be discussed with continued reference to FIGS. 1 and 2. The harrow 26 is not necessary in many applications in which clod reduction and/or soil level maximization are not of concern. Where it is employed, the harrow 26 may comprise any rotary or tine structure configured to break up clods and level ridges left by the cultivator 24. In the illustrated embodiment, the harrow 26 comprises a tine harrow divided into a center, main section 54 and two end sections 56, 58 that are disposed laterally adjacent the main section 54. The main section 54 of the illustrated embodiment is wider than the two flanking end sections 56 and 58. However, different numbers of harrow sections of different relative widths, or even a single harrow section spanning the width of the swath tilled by the cultivator 24, could be provided if desired.

Still referring to FIGS. 1 and 2, each harrow section includes at least a plurality of tines 60 and a frame that supports the tines 60. The frame preferably comprises 1) a plurality (4 in the illustrated embodiment) of tine bars 62 that support the tines 60 in longitudinally spaced, transversely extending rows, and 2) a pair of longitudinally extending support arms 64. The frame is coupled to the cultivator mainframe 28 by a tow arm 66 pivotably attached to the rearwardmost rank tube 52b of the mainframe 28 by a pivoting mount 68. The tow arm 66, in turn, provides part of a parallelogram linkage mechanism that permits the frame to move vertically relative to the tow arm 66 while maintaining a parallel relationship therebetween. Each parallelogram linkage includes a tow arm 66, a corresponding support arm 64 of the frame, and front and rear links 70, 72 connecting the support arm 64 to the tow arm 66.

A one pass seedbed preparation operation performable by the implement will now be described.

As the implement 20 is pulled along the soil to be worked in a draft direction, the disc harrow 22 cuts residue and turns soil as detailed in Section 3 below. The cultivator 24 then passes over the soil worked by the disc harrow 22, with each rank of shanks 32 tilling a previously-untilled portion of the swath worked by the shanks of the preceding rank. Hence the shanks ahead of the rear two rows of shanks take a full cut and leave alternating strips of untilled soil. The shanks in the next to last row till one half of the width of the remaining untilled strips and take out the middle of the ridges left by the shanks in the row directly in front of that row. The shanks of the rear row till the other half of the untilled strips and fill the grooves left by the next to last row of shanks and take out the middle of the ridge left by the shanks of the third row, resulting in a groove behind each of the shanks of the rear row and a ridge adjacent each groove.

The harrow 26 then levels the ridges and grooves left by the cultivator 24 and reduces clods left behind by the cultivator 24. The soil is now ready for planting, with the desired surface residue, soil tilth, and other soil characteristics being obtained by suitable adjustments to the disc gang angle, disc penetration depth, and cultivator penetration depth.

3. Construction and Operation of Disc Gang

Still referring to FIGS. 1 and 2, the disc harrow 22 of the combined seedbed preparation implement 20 comprises two sets of disc gangs provided on opposite sides of a line L that laterally bisects the seedbed preparation implement 20. The number of disc gangs in each set will vary depending upon the overall width of the implement 20 and on the length of the individual gangs. In the illustrated embodiment in which the implement is about 26' wide, each set is formed from inboard and outboard disc gangs 80 and 82 that are independently mounted on the mainframe 28 and independently adjustable to vary the disc gang angle. The gangs 80 and 82 of each set are located adjacent one another on opposite sides of a hinge 48 of the mainframe 28 so that the inboard gang 80 moves with the center section 42 of the mainframe 28 while the outboard gang 82 can pivot up and down with the wing 44 or 46. An actuator 74 is provided for effecting gang angle adjustment of each disc gang 80 or 82.

Figure 9:
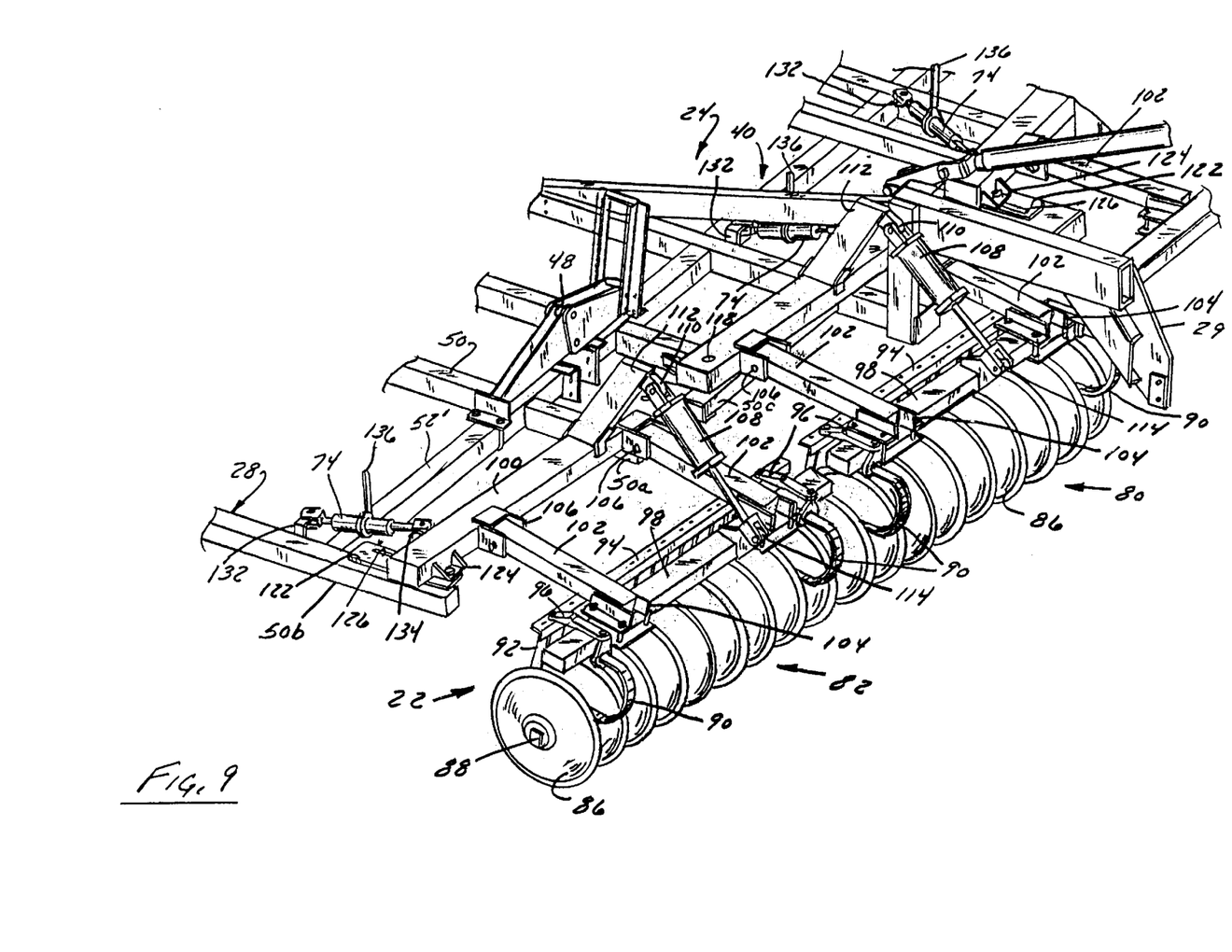
FIG. 9 is a fragmentary perspective view of the disc gang assembly of FIG. 3 and adjacent components of the implement.

The inboard and outboard gangs 80, 82 each have a first end pivotably mounted on the cultivator mainframe 28 and a second end slidably supported on the mainframe. Specifically, and referring initially to FIGS. 3 and 9, the first or pivoting end of the outboard gang 82 is mounted on an extension 50a of one of the inboard longitudinal beams, and the second end is mounted on an extension of the outward-most longitudinal beams 50b. The first and second ends of the inboard gang 80 are similarly mounted on a transverse beam 52c and a longitudinal beam 50c, respectively.

Apart from their mounting locations on the mainframe 28, the inboard and outboard disc gangs 80 and 82 of each set are identical to one another. Components of each disc gang 80, 82 therefore will be designated by the same reference numerals, and the same description will be applied towards all disc gangs.

Figure 3:
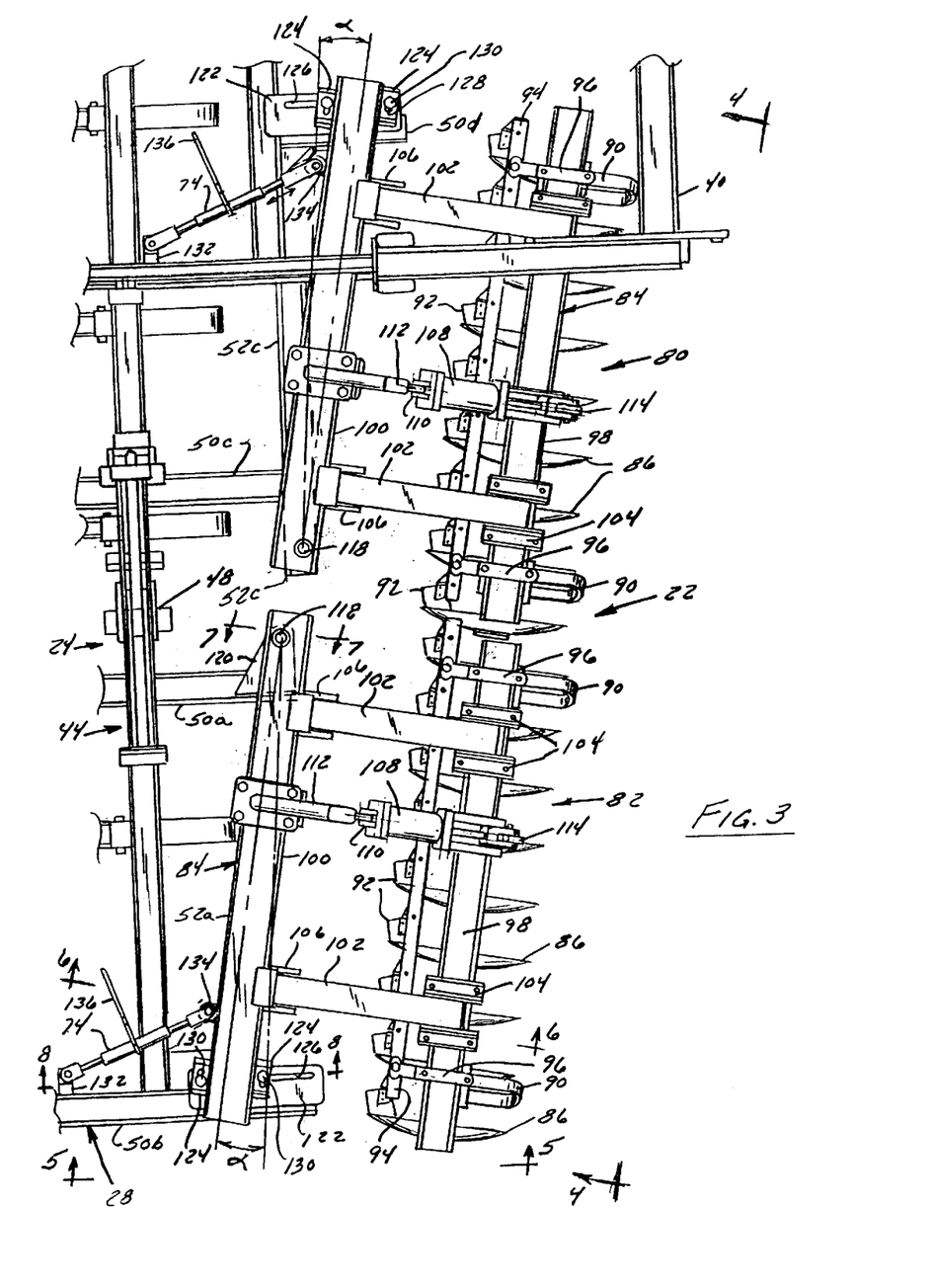
FIG. 3 is a fragmentary top plan view of a portion of the implement of FIGS. 1 and 2, including one of the disc gang assemblies of that implement.
Figure 4:
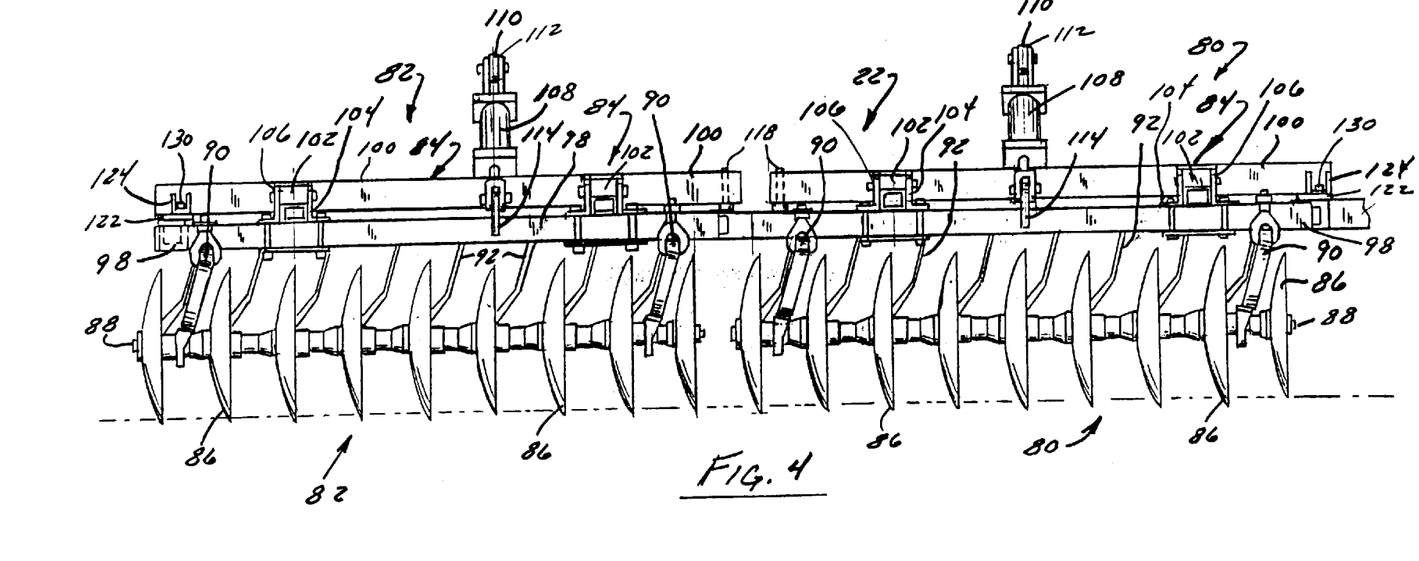
FIG. 4 is a front elevation view taken generally along the lines 4—4 in FIG. 3.
Figure 5:
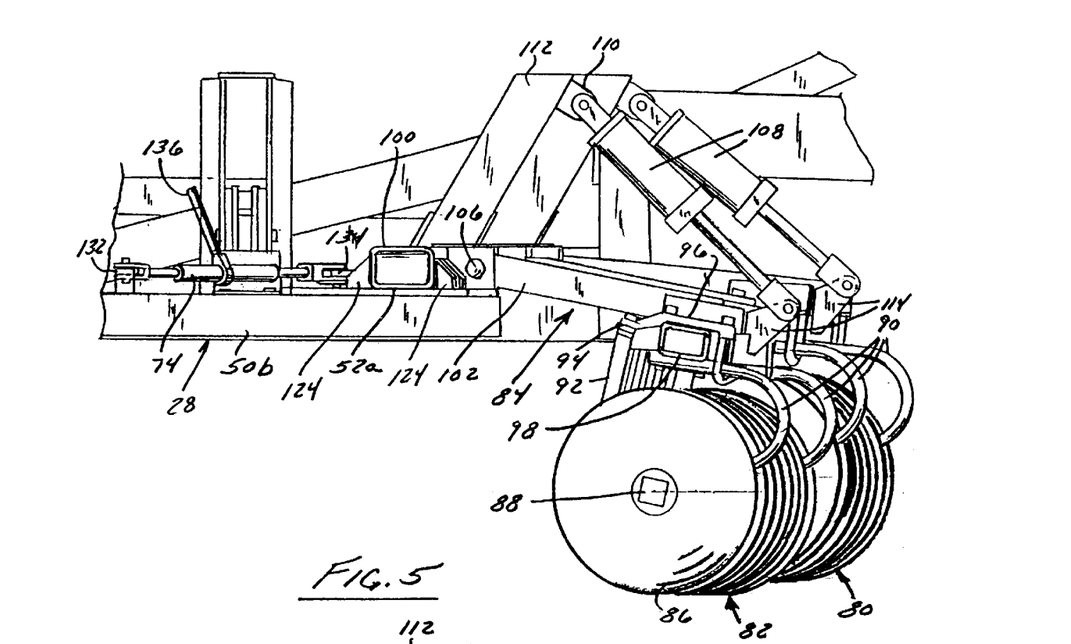
FIG. 5 is a side elevation view taken generally along the lines 5—5 of FIG. 3.

Referring now to FIGS. 3–5 and 10, the outboard disc gang 82 comprises a modular unit mounted on the front end of the cultivator mainframe 28. It includes a frame 84 and a plurality of discs 86 that are supported on the frame 84 and that ride along the ground during a tillage operation. Referring to FIGS. 3–5, a plurality (9 in the illustrated embodiment) of the discs 86 are spaced along the length of the frame 84. Each disc 86 has a concave surface that faces the transverse centerline L of the implement 20. All of the discs 86 are mounted on a common bolt or shaft 88 so as to rotate about a common axis that extends at the disc gang angle. The shaft 88 is supported on the frame 84 by a pair of spaced carrier springs 90. The carrier springs 90 assert a yieldable downward pressure on the discs 86 but permit limited movement of the discs 86 relative to the frame 84 to accommodate variations in ground topography or the encountering of large rocks. A scraper 92 is disposed closely adjacent the rear sides of each disc 86 to scrape soil and plant residue from the associated disc 86. The scrapers 92 are mounted on a support bar 94 clamped on the frame 84 by a plurality of longitudinally-spaced clamps 96.

Still referring to FIGS. 3–5, the frame 84 may comprise any structure that supports the discs 86 and scrapers 92 and that permits the gang angle to be adjusted. The frame 84 preferably also is configured to permit vertical movement of the discs 86 relative to the mainframe 28 to adjust cutting depth. In the illustrated embodiment, the frame 84 includes a disc support beam 98 that supports the discs 86 and a main beam 100 that mounts the disc gang 82 on the mainframe 28. The beams 98, 100 are parallel with one another and with the gang angle. Each of the beams 98 and 100 comprises a rectangular hollow tube, but I-beams, n-beams, angle-irons, or flat plates could be used as well. The frame 84 additionally includes a pair of spaced arms 102 that connect the beams 98, 100 to one another. The arms 102 extend in parallel with one another and transversely to the beams 98 and 100. Each arm 102 comprises an niron, but could be formed from a tube, flat plate, etc.

Figure 6:
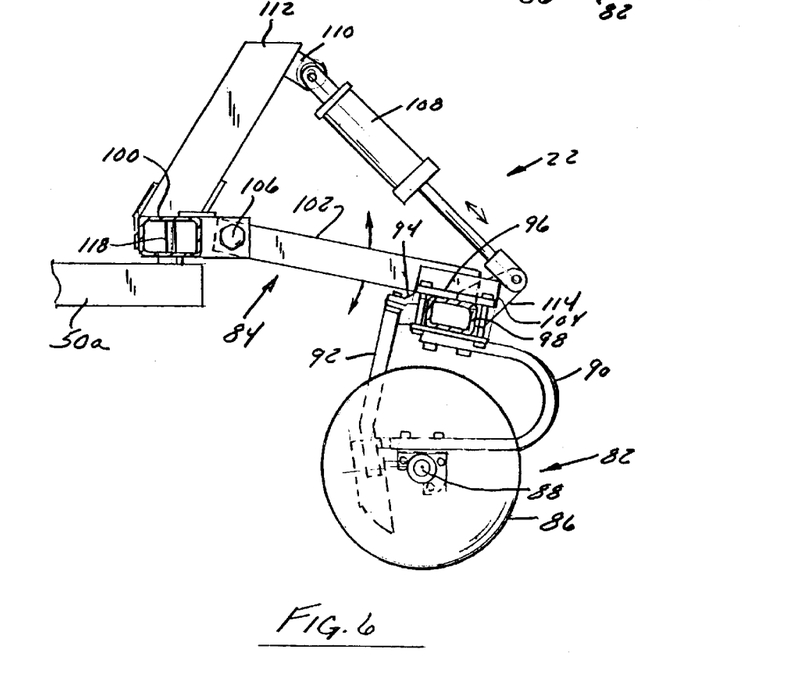
FIG. 6 is a sectional elevation view taken generally along the lines 6—6 of FIG. 3.
Figure 10:
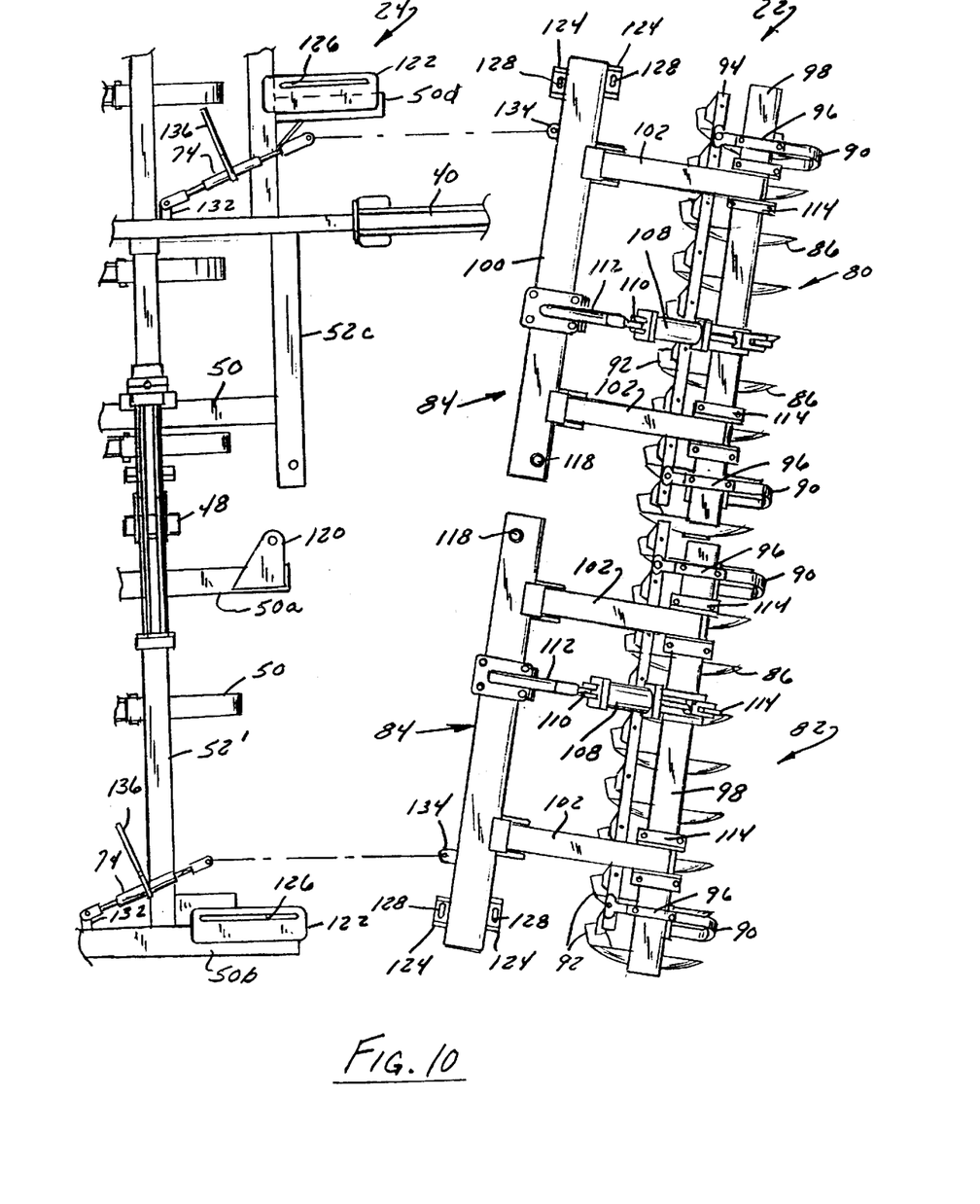
FIG. 10 is a fragmentary, partially exploded top plan view of the disc gang assembly of FIG. 3 and adjacent components of the implement, illustrating the disc gang assembly removed from the remainder of the implement.

Referring to FIGS. 3, 5, and 6, the front end of each of the arms 102 is rigidly mounted on top of the disc support beam 98 by a bracket 104. The rear end of each of the arms 102 is pivotably attached to the main beam 100 by a clevis pin assembly 106. This arrangement permits the disc support beam 98 and discs 86 to be raised and lowered relative to the main beam 100 to change the cutting depth for a particular cultivator depth setting. This cutting depth is adjusted by extending or retracting a hydraulic cylinder 108 operably coupled to the beams 98 and 100. Specifically referring to FIGS. 6, 9, and 10, a cylinder end of the cylinder 108 is pinned to an ear mount 110 extending forwardly from an upwardly and forwardly inclined strut 112 mounted on a generally central portion of the main beam 100. A rod end of the cylinder 108 is pivotably attached to another ear mount 114 mounted on front of a generally central portion of the disc support beam 98. As best seen in FIGS. 3 and 10, this relationship between the hydraulic cylinder 108 and the frame components 98, 100 renders the disc gang 82 as a whole modular and permits the essentially entire disc gang 82 to be attached to or removed from the mainframe 28 as a unit, thereby enhancing versatility of the implement 20 and simplifying manufacturing and assembly.

It is conceivable that gang angle adjustment could be accommodated by a suitable connection of the disc support beam 98 to the arms 102 or of the arms 102 to the main beam 100. If depth adjustment is not desired, it is also conceivable that this adjustment could be accommodated by eliminating the main beam 100 and mounting the disc support beam 98 directly on the mainframe 28 so as to accommodate angular adjustment of the disc support beam 98 relative to the mainframe 28. In the illustrated embodiment, however, gang angle adjustment is accommodated by mounting the main beam 100 on the cultivator mainframe 28 so as to permit the entire frame 84 to pivot about a vertical axis through a gang adjust angle $\alpha$ (FIG. 3). The angle $\alpha$ typically will extend about 5°, beginning at an angle of about 5° from a perpendicular to the draft direction and ending at an angle of about 10°. However, the extent of the angular range may vary dramatically from application to application. To effect this gang angle adjustment, each disc gang 80, 82 can be driven to pivot about the mainframe 28 by the actuator 74.

Figure 7:
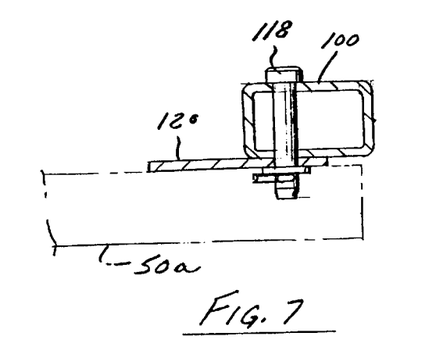
FIG. 7 is a sectional elevation view taken generally along the lines 7—7 of FIG. 3 and illustrating portions of the implement in phantom.

Mounting hardware for accommodating the gang angle adjustment and for holding the disc gang 82 in its adjusted position includes a pivot pin assembly at the first end of the disc gang 82 and a sliding clamp plate arrangement between the first and second ends, and preferably adjacent the second end, of the disc gang. Referring to FIGS. 3 and 7, the pivot pin 118 extends vertically through a bore through the main beam 100 and through a mating bore in an ear mount 120.

Figure 8:
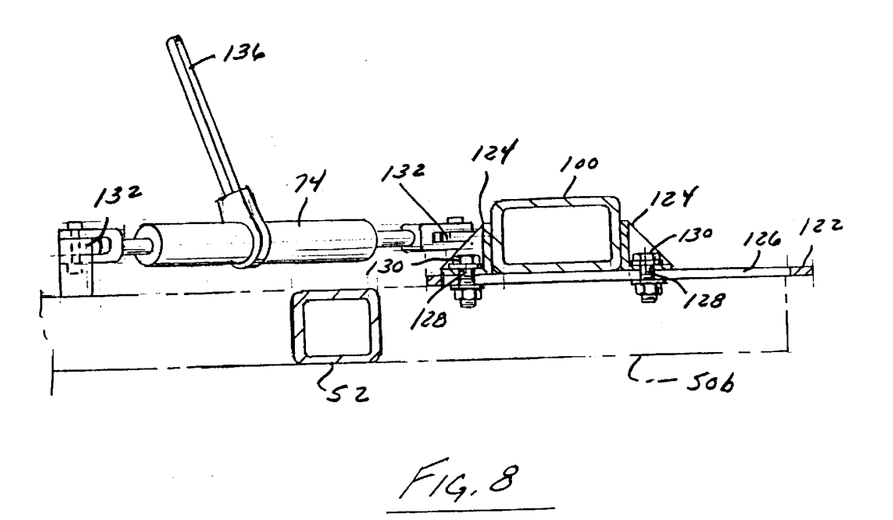
FIG. 8 is a sectional elevation view taken generally along the lines 8—8 of FIG. 3 and illustrating portions of the implement in phantom.

The ear mount 120 is located beneath the main beam 100 and extends transversely from the foremost end of the associated transverse beam 50a as seen in FIG. 3. (The pivot pin assembly for the inboard disc gang 80 differs from the above-described configuration only in that the pin 118 extends directly through the underlying transverse beam 52c rather than through a protruding ear mount.) Referring to FIG. 8, the second end of the main beam 100 is mounted on an unsegmented guide that supports the beam while permitting the beam to pivot through the designated range. In the illustrated embodiment, the guide comprises a slotted plate 122 that supports a pair of angle brackets 124 so as to permit infinite adjustment of the gang angle by sliding the brackets 124 along a slot 126 in the plate 122. Specifically, a vertical leg of each angle bracket 124 is welded or otherwise affixed to each side of the beam 100 so that an elongated slot 128 in the horizontal leg of each bracket 124 overlies an orthogonally-situated elongated slot 126 in the plate 122. The plate 122 is, in turn, welded to the top of the longitudinal beam 50b as seen in FIGS. 3 and 10 (the corresponding plate 122 for the inboard disc gang 80 is welded to the top of the longitudinal beam 50d, also as illustrated in FIGS. 3 and 10). Pins, such as bolts 130 extend through the mating slots 126 and 128 so as to ride through those slots upon disc gang angle adjustment. If desired, the bolts 130 could be selectively tightened to prevent inadvertent movement of the disc gang 82 relative to the mainframe 28, but that tightening would not be required in situations in which the actuator 74 is capable of holding the disc gang in position.

The actuator 74 may comprise any manually operated or powered device that is selectively actuatable to drive the associated main beam 100 to pivot about the pin 118. The actuator 74 of the illustrated embodiment comprises a turnbuckle. As best seen in FIGS. 8 and 10, the turnbuckle 74 has a rear end pivotably coupled to an ear 132 on the mainframe 28 and a front end pivotably mounted to an ear mount 134 on the rear of the main beam 100. As is conventional with turnbuckles of this type, manual operation of a crank 136 on the turnbuckle 74 in one direction or the other causes the turnbuckle 74 to extend or retract, resulting in clockwise or counterclockwise pivoting of the associated disc gang 80 or 82 about the associated pivot pin 118 and accordingly, results in gang angle adjustment. Due to the absence of any discreet mount points of the second end of the main beam 100 on the mainframe 28, this adjustment can be infinite within the desired range of gang angle adjustment rather than discreet. This in turn greatly enhances the versatility of the machine. If desired, decals (not shown) or other indicia may be mounted on the implement 20 in the vicinity of the turnbuckle 74 so as to permit the operator to precisely obtain the desired disc gang angle.

In operation, as the implement 20 is being pulled along the field to be worked by a tractor or other prime mover, the rotating discs 86 cut into the soil and throw the soil inwardly towards the transverse centerline L. The depth of disc penetration for a particular cultivator setting can be adjusted by suitable operation of the hydraulic cylinders 108. The amount of the soil turning and, accordingly, the degree of soil tilth and/or the degree of surface residue coverage remaining behind the disc gang for a particular operating speed in particular soil conditions, is determined by the prevailing gang angle α. That angle can be adjusted for each disc gang simply by loosening the bolts 130, turning the crank 136 to extend or retract the associated turnbuckle 74 to drive the disc gang 80 or 82 to pivot about the associated pin 118, and retightening the bolts 130. Versatility is maximized by permitting the gang angle of the individual gangs 80 and 82 of each set to be adjusted individually. For instance, it may be desirable in some instances to set a slightly shallower disc gang angle for the inboard gang 80 of each set to prevent soil from ridging at the center of the machine. The individual adjustment made possible by the invention makes "fine tuning" for this and other purposes possible. The cutting depths of each gang 80 and 82 of each set can also be adjusted by suitable operation of the cylinders 108.

Many changes and modifications could be made to the invention without departing from the spirit thereof. For instance, the gang angle adjustment characteristics of the present invention are applicable to implements other than a multi component seedbed preparation implement. Those other implements include, but are not limited to, a tandem standalone disc harrow. Different mounting arrangements could also be used for mounting the disc gangs on the mainframe of the implement, and the disc gang frames could take other forms than that disclosed, particularly if the machine does not require cutting depth adjustment capability. Actuators other than turnbuckles could also be used to effect gang angle adjustment. For instance, a double acting hydraulic cylinder could be used in place of each turnbuckle. A cylinder would have the benefit of being of being capable of automatically adjusting gang angle "on the fly" with the use of appropriate sensors and control circuitry. If a cylinder were used, and if adjustment on the fly is not required, a heavier duty locking system would preferably be used in place of the bolts to negate the need to rely on hydraulic pressure in the cylinders to hold the disc gangs in place.

Other changes will become apparent from the appended claims.

What is claimed is:

1. A seedbed preparation implement comprising:
   (A) a cultivator including
      (1) a mainframe configured to be pulled in a draft direction, and
      (2) a plurality of ground engaging plow shanks mounted on said mainframe; and
   (B) a disc harrow including at least one disc gang, said disc gang including
      (1) a disc support beam,
      (2) a plurality of ground engaging discs which are rotatably supported on said disc support beam and which are configured to rotate about a common axis that extends at a disc gang angle relative to a perpendicular to said draft direction,
      (3) a main beam to which said disc support beam is attached and which is mounted on said mainframe so as to permit said disc gang to be movable relative to said mainframe as a unit so as to adjust said gang angle, said main beam being pivotably mounted on said mainframe adjacent a first end thereof and mounted on a support at a location remote from said first end so as to permit said main beam to slide along an unsegmented guide on said support during gang angle adjustment.

2. The seedbed preparation implement as recited in claim 1, wherein said gang angle is infinitely adjustable within at least a designated range.

3. The seedbed preparation implement as recited in claim 2, wherein said designated range extends from about 5° to about 10°.

4. The seedbed preparation implement as recited in claim 3, further comprising an actuator that is coupled to said disc gang and to said mainframe and that is operable to pivot said disc gang about said mainframe to effect gang angle adjustment.

5. The seedbed preparation implement as recited in claim 4, wherein said actuator comprises a turnbuckle.

6. The seedbed preparation implement as recited in claim 5, further comprising support arms which couple said main beam to said disc support beam, said support arms being pivotable to raise and lower said disc support beam relative to said main beam and, thereby, adjusting a cutting depth of said discs.

7. The seedbed preparation implement as recited in claim 6, wherein said main beam is mounted on a front end of said mainframe and said disc support beam is disposed in front of said main beam.

8. The seedbed preparation implement as recited in claim 7, wherein two sets of disc gangs are provided on opposite sides of a line that laterally bisects said seedbed preparation implement, each disc gang set being formed from at least two disc gangs that have independently adjustable gang angles.

9. The seedbed preparation implement as recited in claim 8, further comprising a harrow that is towed behind said cultivator.

10. A seedbed preparation implement comprising:
   (A) a generally rectangular mainframe configured to be pulled in a draft direction, said mainframe having a front end and an opposing rear end, said front end leading said rear end when said mainframe is pulled in said draft direction;
   (B) a plurality of plow shanks extending downwardly from said mainframe; and
   (C) at least two modular disc gangs mounted in front of said mainframe as a unit, each of said disc gangs including
      (1) a disc support beam located in front of said mainframe and extending at a gang angle relative to a perpendicular to said draft direction,
      (2) a plurality of ground engaging rotary discs rotatably supported on said disc support beam,
      (3) a main beam which extends in parallel with said disc support beam and which is disposed between said disc support beam and said mainframe, said main beam being a) attached to said disc support beam so as to maintain said parallel relationship therebetween and b) pivotably mounted on said mainframe adjacent a first end thereof and is mounted on a slotted plate at a location remote from said first end so as to permit said disc gang to be movable relative to said mainframe so as to permit infinite adjustment of said gang angle within at least a range extending from about 5° to about 10°, and
      (4) an actuator which is coupled to said disc gang and to said mainframe and which is operable to move said disc gang relative to said mainframe to effect gang angle adjustment.

11. The seedbed preparation implement as recited in claim 10, wherein said actuator comprises a turnbuckle.

12. The seedbed preparation implement as recited in claim 11, further comprising support arms which couple said main beam to said disc support beam, said support arms being pivotable to permit said disc support beam to be raised and lowered relative to said main beam to adjust a cutting depth of said discs.

13. The seedbed preparation implement as recited in claim 12, wherein two sets of disc gangs are provided on opposite sides of a line that laterally bisects said mainframe, each disc gang set being formed from at least two disc gangs whose gang angles are independently adjustable.

14. A seedbed preparation implement comprising:
   (A) a cultivator including
      (1) a mainframe configured to be pulled in a draft direction, said mainframe having a front end and an opposing rear end, said front end leading said rear end when said mainframe is pulled in said draft direction;
      (2) a plurality of ground engaging plow shanks mounted on said mainframe; and
   (B) a disc harrow including at least two sets of disc gangs provided on opposite sides of a line that laterally bisects the seedbed preparation implement, each disc gang set being formed from at least two disc gangs, each disc gang including
      (1) a disc support beam,
      (2) a main beam to which said disc support beam is attached and which is mounted on said mainframe such that said disc gang to be independently movable relative to said mainframe as a unit so as to adjust the gang angle thereof, said main beam being further pivotably mounted on said mainframe adjacent a first end thereof and mounted on a support at a location remote form said first end so as to permit said main beam to slide along an unsegmented guide on said support during gang angle adjustment.

15. The seedbed preparation implement as recited in claim 14, further comprising support arms which couple said main beam to said disc support beam, said support arms being pivotable to permit said disc support beam to be raised and lowered relative to said main beam to adjust a cutting depth of said discs.

16. The seedbed preparation implement as recited in claim 15, further comprising a separate actuator coupled to each said disc gang and to said mainframe, each said actuator operable to pivot respective said disc gangs about said mainframe to effect gang angle adjustment.

17. The seedbed preparation implement as recited in claim 16, wherein said actuators comprise turnbuckles.

* * * * *